Sept. 6, 1927.

L. A. WATTERS ET AL

SELECTING APPARATUS

Filed Aug. 30, 1919

INVENTORS.
LUTHER A. WATTERS & SAMUEL F. LLOYD,
BY John H. Bruninga
THEIR ATTORNEY.

Sept. 6, 1927.                                                                                            1,641,713
L. A. WATTERS ET AL
SELECTING APPARATUS
Filed Aug. 30, 1919                                      8 Sheets-Sheet 3

INVENTORS
LUTHER A. WATTERS & SAMUEL F. LLOYD,
BY John H. Bruninger
THEIR ATTORNEY

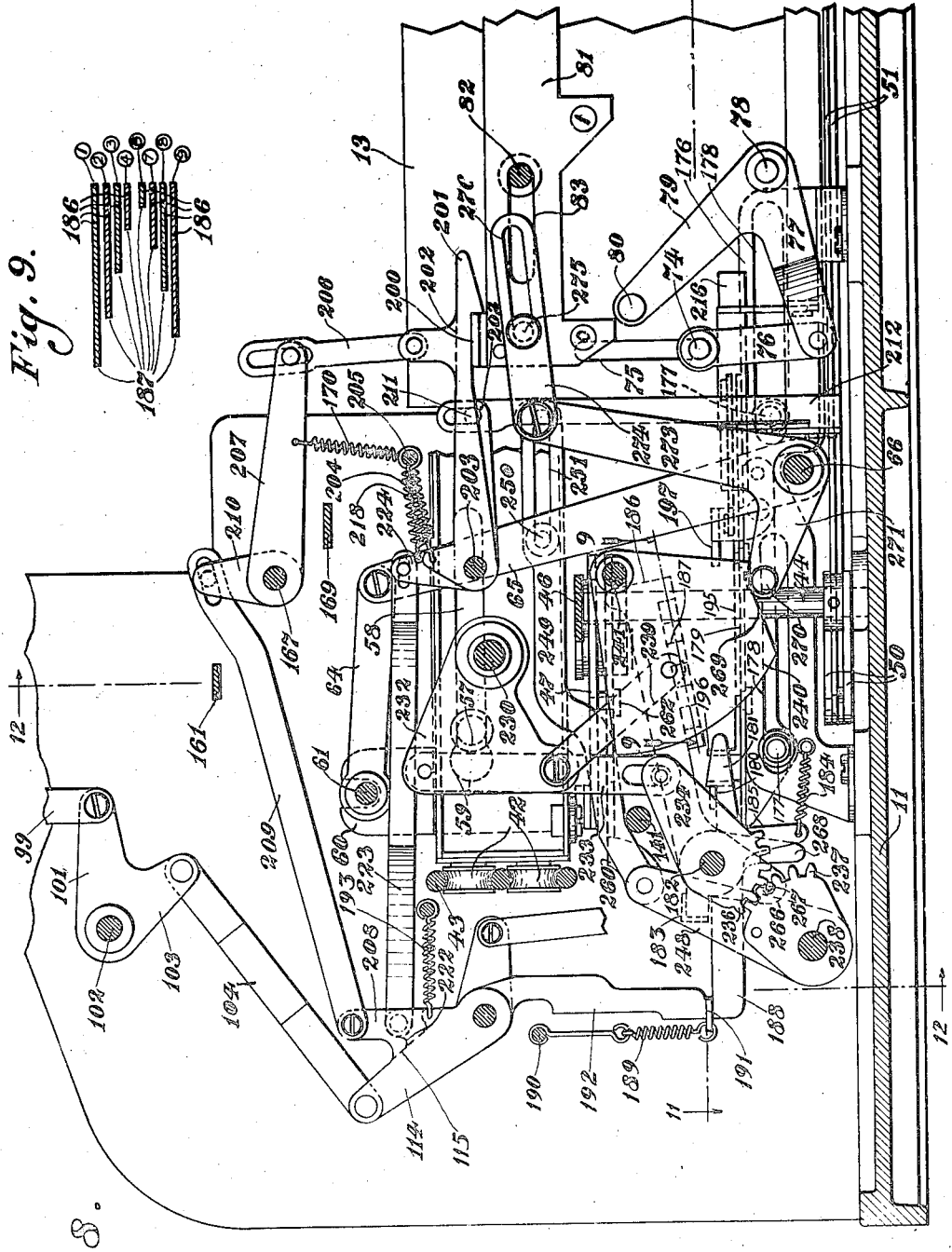

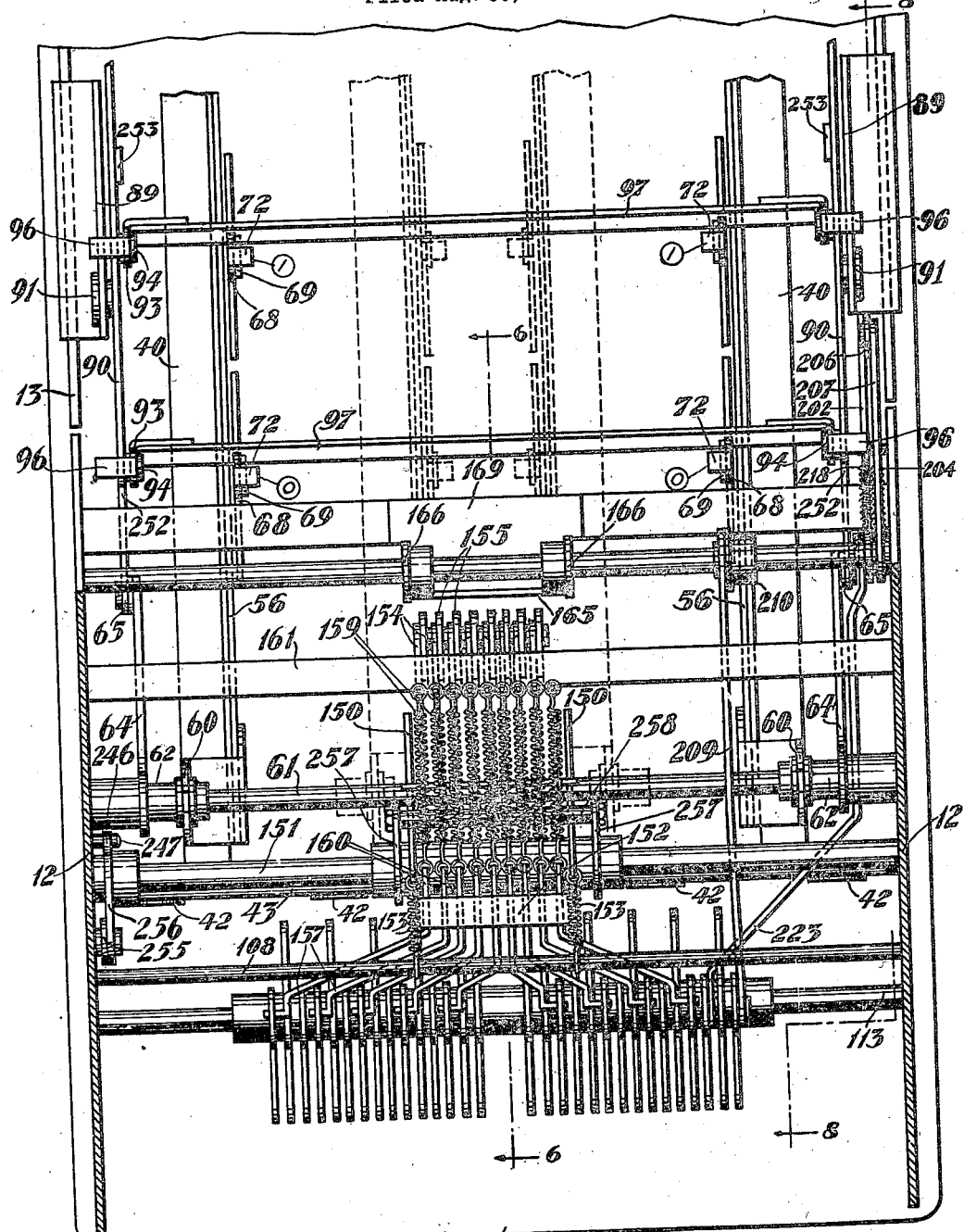

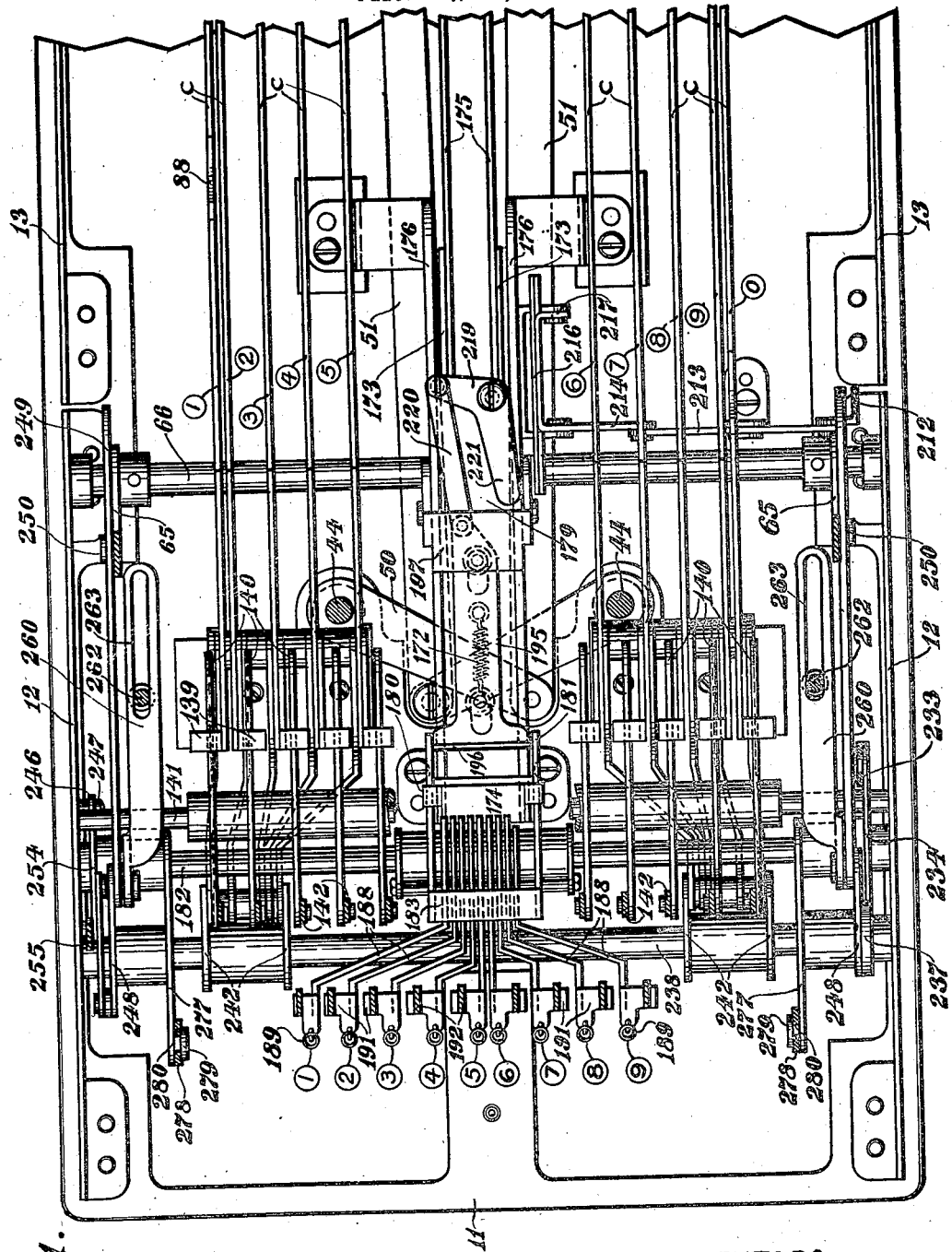

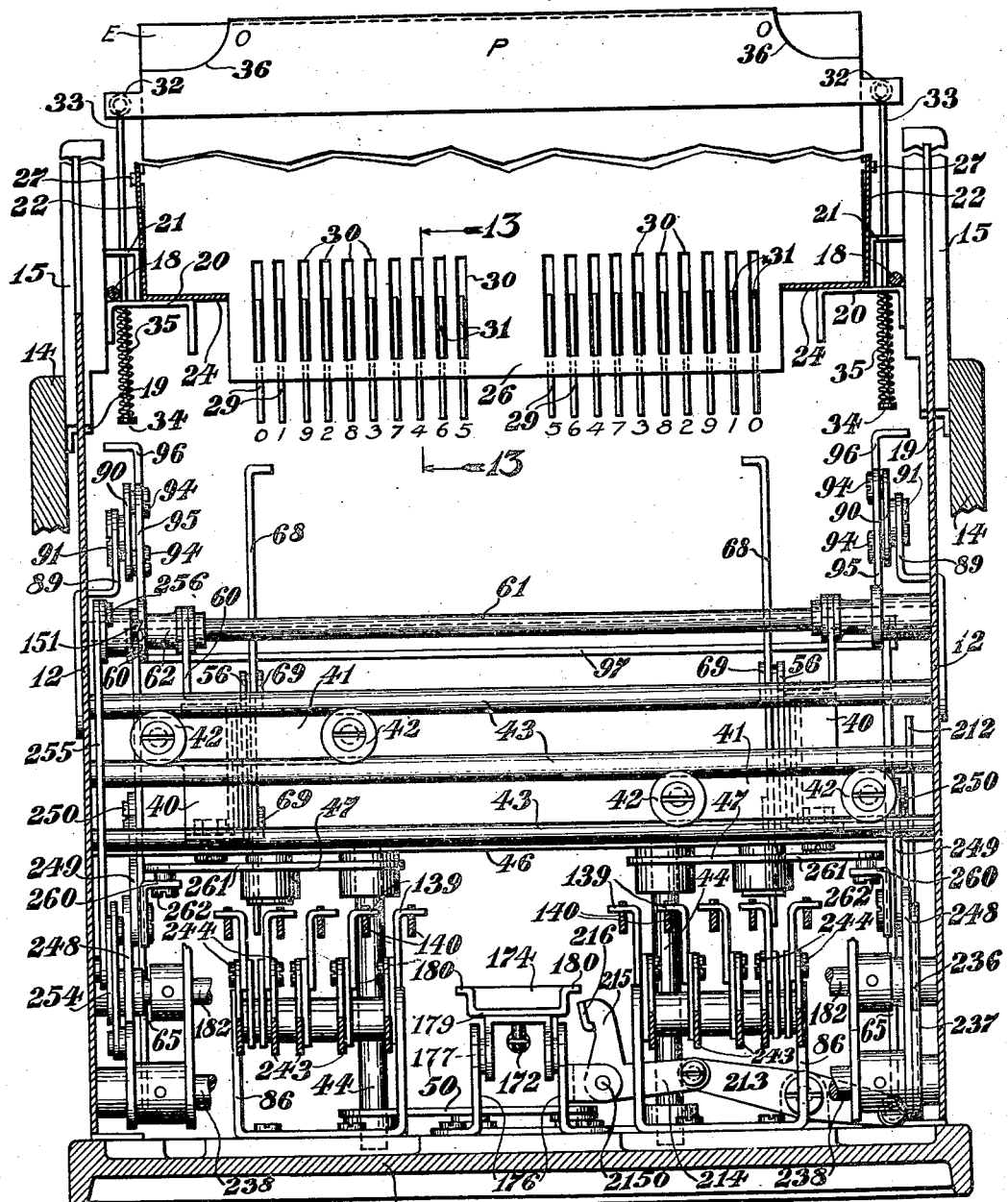
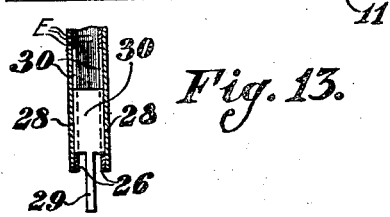
Fig. 12.
Fig. 13.

INVENTORS
LUTHER A. WATTERS & SAMUEL F. LLOYD,
BY John N. Buninga
THEIR ATTORNEY.

Patented Sept. 6, 1927.

1,641,713

UNITED STATES PATENT OFFICE.

LUTHER A. WATTERS AND SAMUEL F. LLOYD, OF ST. LOUIS, MISSOURI, ASSIGNORS, BY MESNE ASSIGNMENTS, TO REMINGTON RAND INC., OF TONAWANDA, NEW YORK, A CORPORATION OF DELAWARE.

SELECTING APPARATUS.

Application filed August 30, 1919. Serial No. 320,940.

This invention relates to selecting apparatus or machines.

In various systems, such as modern accounting systems, it is of advantage to provide mechanism whereby an element to be selected can be readily found. The selected elements are arranged in accordance with a given system, such as the decimal system in which a given unit, such as a thousand, is divided into successive orders or divisions or subdivisions such as hundreds, tens and units. In other systems, such as the alphabetic systems, however, the unit or division is the alphabet itself, comprising twenty-six letters, although the subdivision may be a part of the alphabet on such as the vowels.

One of the objects of this invention, therefore, is to provide a selecting apparatus, whereby a given element to be selected may be located from among a group in a simple, effective and certain manner.

Another object is to provide an apparatus or machine having selective manipulative elements such as keys, upon actuation of which any desired element to be selected may be readily located.

Another object of this invention is to provide a selecting apparatus or machine in which control is given of the locating mechanism by simple key connections arranged in accordance with the orders of a given system.

Further objects will appear from the detail description taken in connection with the accompanying drawings, in which, Figure 1 is a plan of an apparatus or machine embodying this invention;

Figure 8 is a section on the line 8—8, Figure 10;

Figure 9 is a detail section on the line 9—9, Figure 8;

Figure 10 is a section on the line 10—10, Figure 6;

Figure 11 is a section on the line 11—11, Figure 8;

Figure 12 is a section on the line 12—12, Figure 8;

Figure 13 is a detail section on the line 13—13, Figure 12;

Figure 1:
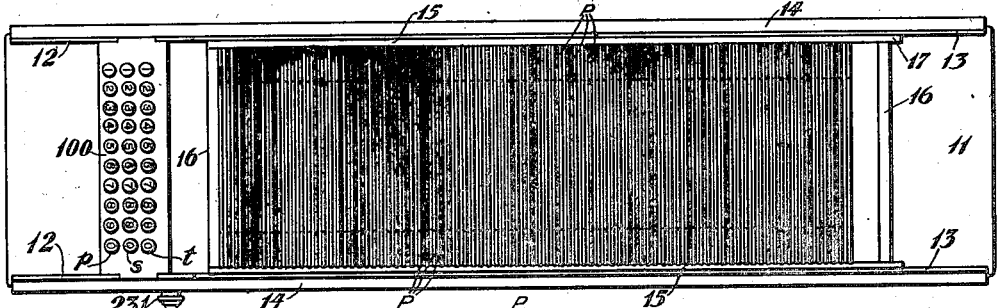

In many of the views parts have been omitted; this has been done to promote clearness, for if all the parts behind the plane at which a view is taken were shown, they would obscure the particular mechanism under consideration.

In the accompanying drawing and description an embodiment of this invention is illustrated as applied more particularly to the finding or selection of cards in a card accounting system, to which particular use this invention is more particularly adaptable. Accordingly, mechanism is provided which operates mechanically upon the manipulation of keys to select from among a number of cards in a tray any desired card or element to be selected. In the embodiment shown and described, the cards, keys and mechanism are arranged in accordance with the decimal system and there are cards in a tray divided into ten divisions of ten subdivisions of ten cards each.

In accordance with this invention mechanism controlled by selective, manipulative elements is adapted to successively locate the selector means in accordance with the successive orders of a given system; and these selective, manipulative elements comprise in this particular embodiment, keys corresponding to the system employed and arranged in sets in accordance with the orders of the system.

In accordance with this invention, the selection is by successive eliminations and by a primary location of a given one hundred group or division, a secondary location of a given tens unit or subdivision, and a tertiary or final location of a given unit or digit, thus making successive locations in diminishing order of subdivisions. Accordingly the mechanism operates to diminishingly locate the selector means in accordance with the successive divisions of the given system.

Referring to Figures 1 to 5 inclusive, and Figure 12, the main frame of the machine comprises a base 11, a pair of side plates or standards 12, and a pair of side plates 13 connected by cross-pieces to form a braced skeleton structure. The side plates may be faced with panels 14 of wood or any other suitable material.

Mounted on the main frame, is a tray support; it comprises a pair of sides 15 and ends 16 connected by rods 18, and is mounted on the main frame and inside of the panels 14, (Figure 12). The panels 14 have supporting ledges 19 and positioning blocks 17 engaging the sides and ends of the tray support, to accurately position and maintain the cards and their plungers in the tray in correct cooperative relation with respect to the selecting means supported in the main frame, as hereinafter described.

*The cards and pilots and their supporting tray.*

Referring to Figures 1, 2, 6, 12, 14 and 15, the sides 15 of the tray support have attached thereto and extending therealong, brackets 20 and side members 21. Mounted on the brackets 20 and between the side members 21, is a tray for receiving the cards and pilots. This tray is preferably constructed of sheet metal and comprises sides 22 and ends 23; the sides extend inwardly at the bottom, as shown at 24, to form supporting ledges for the cards, and flare outwardly, (Figures 12 and 14) to permit ready insertion of the cards.

The ends 23 of the tray are provided with guide plates 25 (Figures 6 and 12) while a series of pairs of guide plates 26 are arranged transversely of the tray in spaced relation, to divide the tray into a series of compartments, and arranged between each pair of guide plates 26 is a flexible partition 28 of sheet metal. The guide plates 25 and 26 and partitions 28 have ears 27 entering apertures in the sides 22.

Arranged between each adjacent pair of plates 25 and 26 are a series of plungers 29 (Figures 6, 12 and 13), having laterally extending wings 31 engaging vertical slots 30 in the plates. The plungers are thus supported and guided for limited vertical movements, and normally project beyond the guide plates 25 and 26, while their top faces lie in a horizontal plane slightly below the bottom of the tray (Figure 12).

In this embodiment, a tray is adapted to receive one thousand cards in one hundred subdivisions of ten cards each. Accordingly, there are one hundred compartments, each adapted to receive ten cards E (Figure 13). In each compartment are a series of twenty plungers arranged in ten pairs, the plungers of a pair being arranged symmetrically with respect to the center of the compartment, and operable in unison to isolate the card as hereinafter described.

Figure 14:
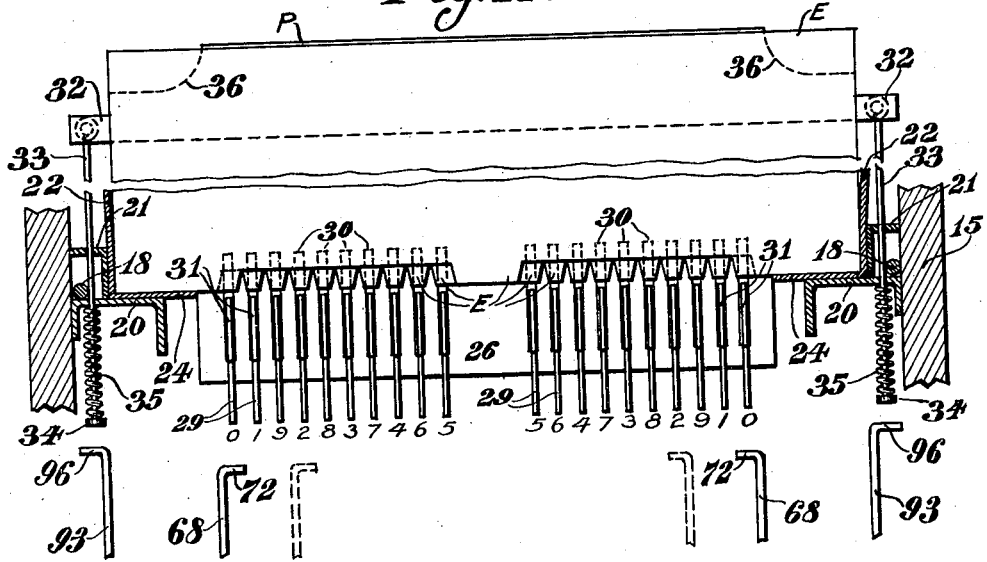
Figure 14 is a diagrammatic front elevation, partly in section illustrating the operation of the machine.
Figure 15:
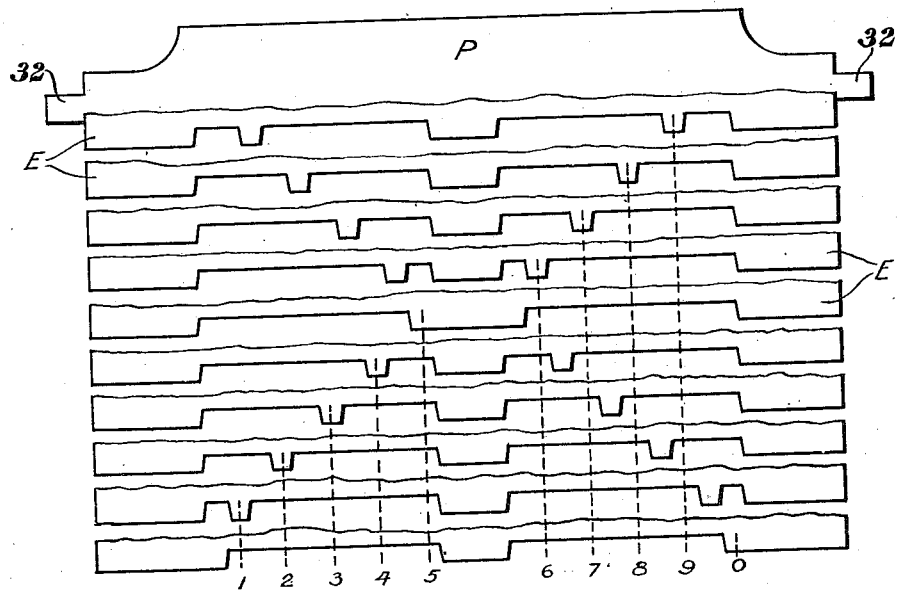
Figure 15 is a detail showing a subdivision of cards and its pilot.

Referring to Figures 14 and 15, the length of the card E is equal to the width of the tray at the bottom thereof, and this card may be formed of paper or any other suitable material. A series of ten of these cards are arranged in a compartment, and each card is provided with plunger or selector engaging lugs corresponding to its pair of engaging plungers. These lugs "0" to "9" are formed by cutting the bottom of the card, and are arranged in pairs, the lugs of a pair being arranged symmetrically on opposite sides of the center line of the card. The lugs on a set of ten cards are spaced variably along the bottom of the card, so that the lugs on the different cards will be in different or variant positions along the cards, corresponding to the positions of the plungers in the bottom of a compartment.

Figure 6:
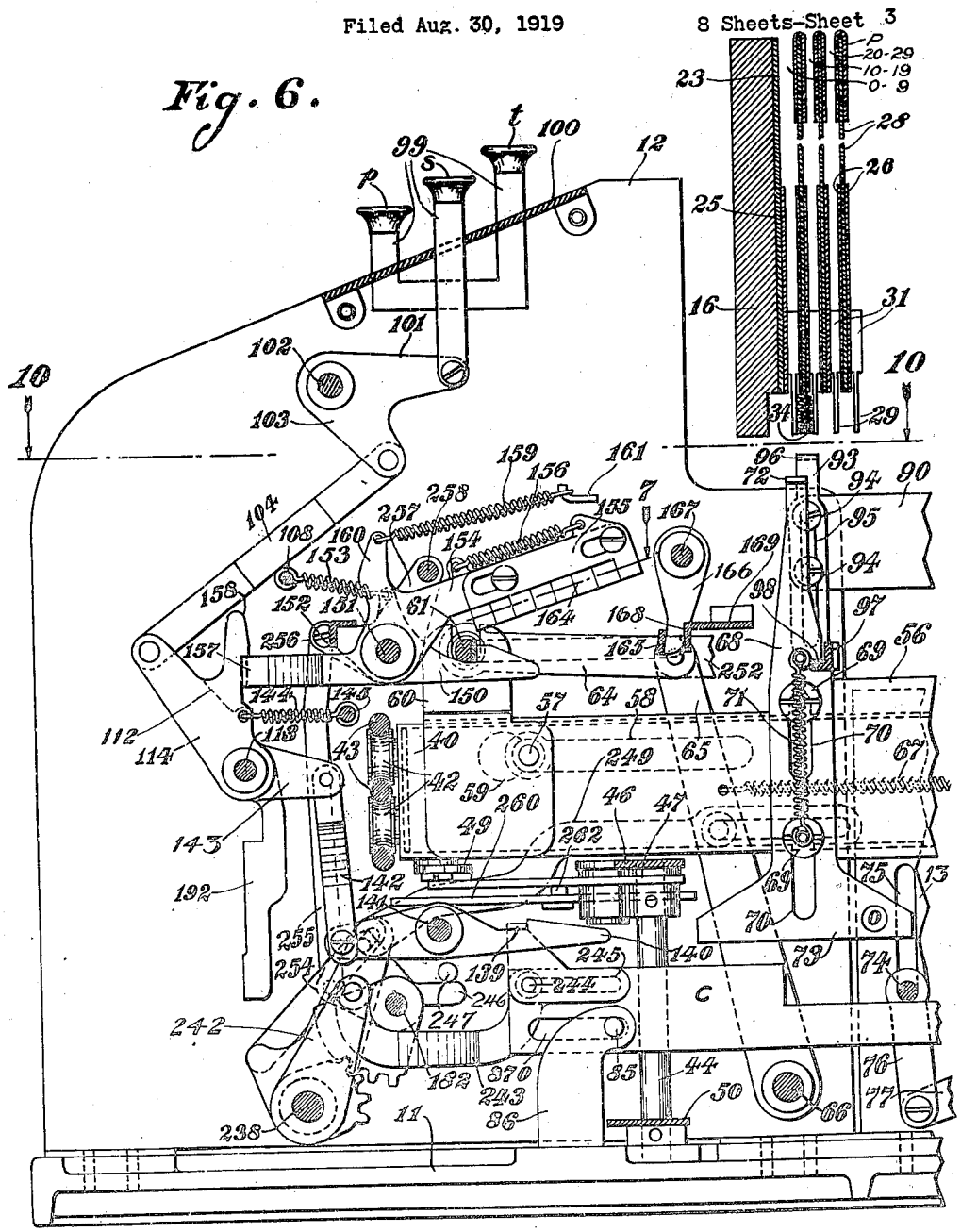
Figure 6 is a section on the line 6—6, Figure 10.

The width of a plunger is equal to the combined thickness of a set of ten cards; due to the fact, however, that the lugs on the different cards are arranged to correspond to the positions of their actuating selectors or plungers, the actuation of a pair of plungers will only operate to raise a single card whose lugs correspond in position to the position of the pair of plungers. Thus, if the pair of plungers "2", are raised (Figure 14) they will only raise card number "2", while the other cards of the set will not be disturbed. Accordingly, the actuation of a selected pair of plungers will raise the corresponding card in its compartment above the other cards therein, so as to isolate the selected card from the other cards of the set. It will be understood that the cards in one compartment correspond to the cards in each and every other compartment in structure, so that the different cards in a system will never exceed ten, no matter what may be the aggregate number of the cards in the system. Accordingly, the cards, in the first compartment will be numbered "0" to "9", in the second compartment "10" to "19" inclusive, and so on (Figure 6).

Each compartment has a pilot for the purpose of isolating the compartment or subdivision of cards. This pilot P (Figures 6, 12, 14 and 15) is preferably constructed of sheet metal and is a U-shaped structure folding over and engaging the top of its partition 28, so as to slide vertically thereon. It is attached by ears 32 to vertical plunger rods 33, guided in the brackets 20 and the side members 21, and provided with heads 34, while springs 35 normally hold the pilot at the lower limit of its movement. When, however, the pilot is raised through the engagement of suitable selectors with the plunger heads 34, it will be projected above its partition and above the set of cards in the compartment in front of the partition, so as to isolate the subdivision of cards in that compartment. The ends of the pilot are cut away at 36, to expose the upper corners of the cards (Figure 14), and these pilots may be provided with suitable numerals designating the number of the subdivision (Figure 12).

The selector supporting carriage.

Referring to Figures 3, 4, 6, 8, 10 and 12, 40 designates a pair of side bars, which extend along the machine and form together a carriage for the selectors. Each side bar has fixed to each end thereof, a cross-head 41, provided with rolls 42 engaging cross-bars 43, mounted between the side plates 12, and forming tracks for the cross-heads, to permit movement of the side bars 40 towards and from each other.

Pairs of rock-shafts 44 and 45 (Figures 3 and 12) at the front and the rear of the machine respectively, have bearings in the base 11 and in cross-pieces 46, supported by the side plates. Fixed to the rock-shafts 44 are arms 47, and fixed to the rock-shaft 45 are arms 48 connected by links 49 with the cross-heads 41. The rock-shafts 44 and 45 have fixed thereto arms 50, (Figures 3 and 4) also arranged in pairs. An arm 50 of each pair is connected by links 51 joined together at their center by a pin 52, fixed to a cross-head 53, having a slot engaging pins 54 on the base 11 (Figure 3), so as to guide this cross-head. A strong spring 55 connecting the cross-head with the base 11, acts normally to move the links 51 to the right (Figure 3), so as to swing the arms 50 and rotate the rockshafts 44 and 45 of a pair in opposite directions, to swing the arms 47 and 48 inwardly and towards each other; this will tend to move the side bars 40 from their extreme outer limit (Figure 3) to their extreme inner limit.

The card selector carriers.

Figure 2:
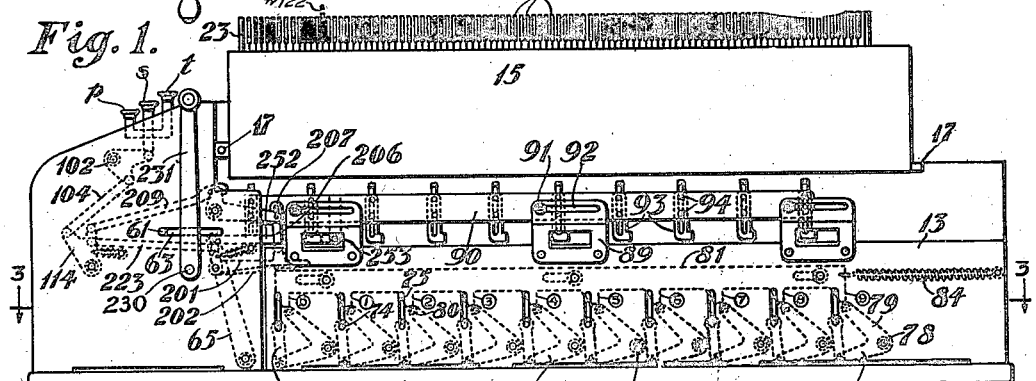
Figure 2 is a side elevation, but with the encasing sides of the frame removed.

Referring to Figures 3, 4, 6 and 10, mounted on the inside faces of the side bars 40 are a pair of side bars 56 forming the carriers for the card selectors, these carriers being mounted for longitudinal sliding movement by means of headed pins 57 fixed to the carriers and engaging slots 58 in the side bars 40, the ends of the slots 58 being enlarged at 59 to permit assembling. Cross-heads 60 on the carriers 56 engage collars 62 sliding on the cross-bar 61, which slides in ways 63 in the side plates 12 (Figure 2). The cross-bar 61 is connected by links 64 with arms 65 mounted on a rock-shaft 66 between the side plates 12, and springs 67 normally tend to slide the carriers 56 to the right (Figure 6) on the side bars 40.

The card selectors.

Figure 4:
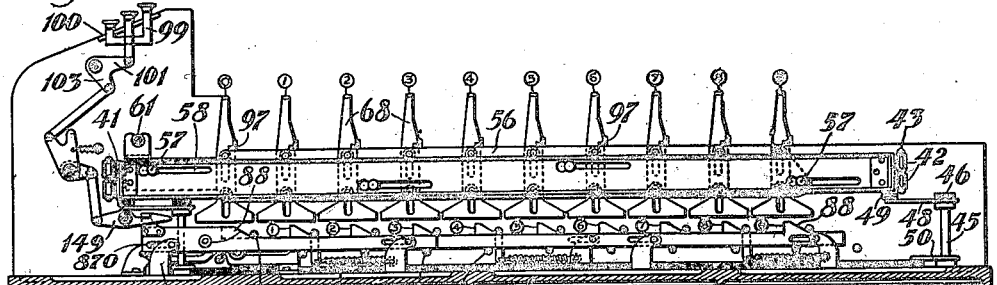
Figure 4 is a section on the line 4—4, Figure 3.
Figure 5:
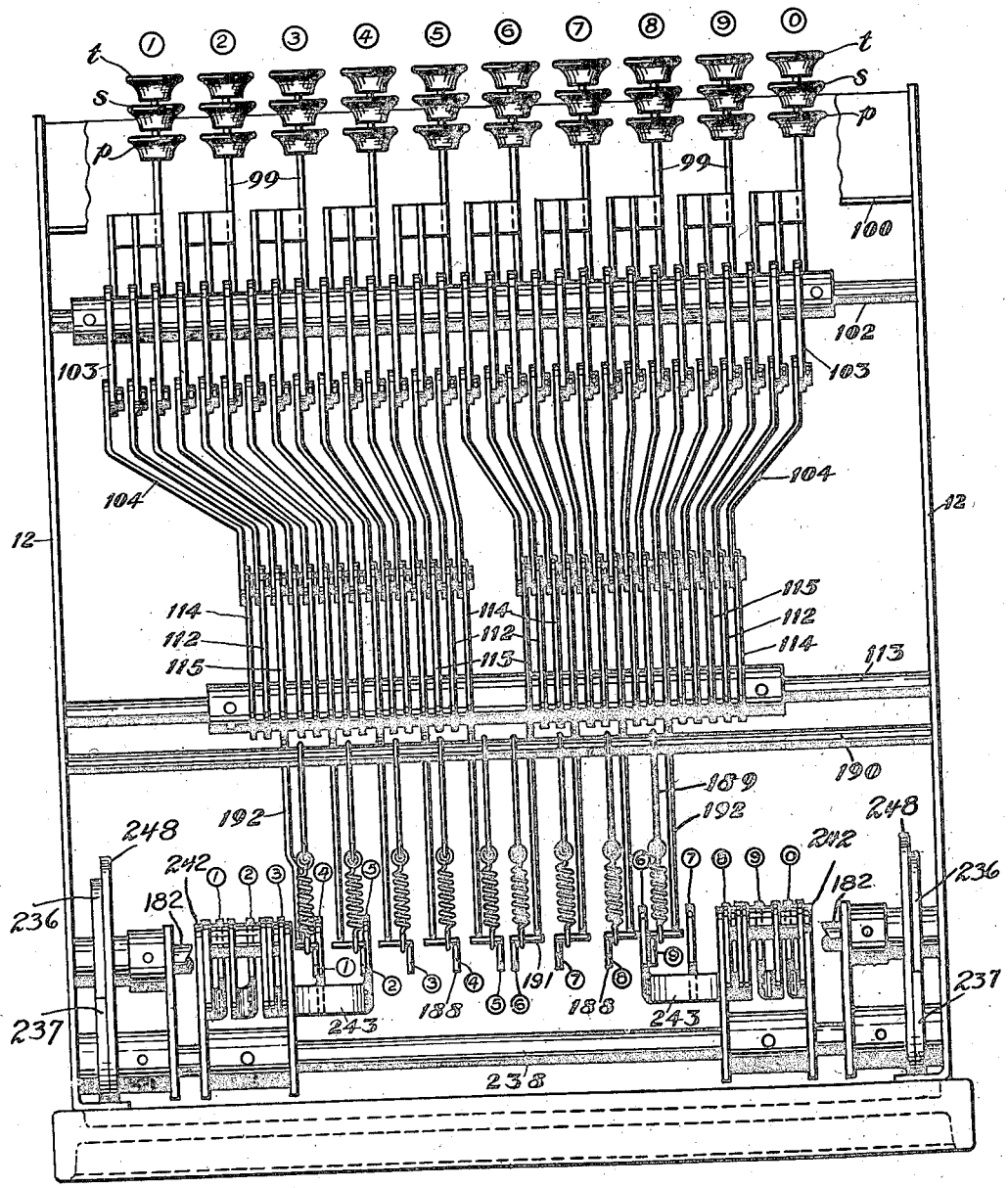
Figure 5 is an enlarged elevation of the front end of the machine, the mechanism in the rear being omitted.

Referring to Figures 4, 6 and 10, mounted on the carriers 56 are a series of pairs of selectors 68, ten in number, corresponding to the primary divisions or groups of one hundred cards each. Each selector is guided vertically on its carrier by headed pins 69 engaging slots 70 in the selectors, and is retained in its lowermost position (Figure 6) by a spring 71. The upper ends 72 of these selectors are turned inwardly (Figure 6) and 10) to engage the plungers 29 mounted in the tray.

The selector actuators.

The lower end of each selector (Figure 6) provides a head 73, engaged by a cross-bar 74 travelling in vertical slots 75 in the side plates 13, and supported by links 76 on arms 77, fixed to the rock-shaft 78 (Figures 3 and 8), mounted in the side plate 13. One of these arms forms a bell-crank lever with an arm 79, provided with a laterally projecting pin 80, engaged by a lug on an actuator bar 81, mounted for sliding movement on the right side plate 13, by pins 82 engaging slots 83. A spring 84 (Figure 2) normally tends to move its actuator to the right (Figure 2). The actuator has a series of projecting lugs "0" to "9", corresponding to the ten groups of cards in the tray, and engaging the pins 80 on the bell-crank levers 77—79.

The effectual bars.

Referring to Figures 3, 4, 6 and 11, arranged on the base 11 are a series of bars C numbered "0" to "9" inclusive (Figures 3 and 11), corresponding to the ten groups of cards of one hundred each. Each bar is guided for movement by pins 85 on brackets 86 on the base, engaging slots 870 in the bar, and a spring 87 normally tends to move the bar to the right (Figure 4). Each bar has a cam face 88, engaging a corresponding cross-bar 74.

The pilot selectors and carriers.

Referring to Figures 2, 3, 6 and 10, mounted on the side plates 13 are brackets 89, supporting a pair of side bars or carriers 90, which have pins 91 engaging slots 92 in the brackets. Pilot selectors 93 are mounted for vertical movements on these carriers by pin and slot connections 94 and 95, and each selector has an extending bearing surface 96 adapted to engage its plunger 34. Each pair of pilot selectors is connected by a cross-bar 97 having a rib 98 engaging corresponding recesses in the card selectors 68, causing the pilot selectors to move vertically with the card selectors, but permitting inward sliding movement of the card selectors.

The key mechanism.

Referring to Figures 1, 2, 4, 5, 6 and 8, the key board comprises a series of sets of keys. In the particular embodiment shown, there are three sets of keys, the sets being designated p s t, each set or row comprising ten keys, numbered from "1" to "0" inclusive. The key shanks 99 are mounted to slide in slots in a guide plate 100 mounted between the side plates 12. The key mechanism of the different keys of a set are similar, except some of the connections hereinafter referred to as, those for the "0" key.

Each key shank 99 is connected to one arm 101 of a bell-crank lever, there being a series (in this case thirty) of bell-crank levers, corresponding in number to the total number of keys, arranged in suitable spaced relation on the shaft 102. Each bell-crank lever is provided with a second arm 103, connected by a link 104 with a corresponding bell-crank lever on a shaft 113, which is mounted between the side plates 12. There are thirty bell-crank levers arranged in suitable spaced relation on the shaft 113 and these bell-crank levers are arranged in three sets corresponding to the three sets of keys p s t. The bell-crank levers corresponding to and connected with the set of keys p are indicated 112; the set of bell-crank levers corresponding to the set of keys s are designated 114; while the set of bell-crank levers corresponding to the set of keys t are designated 115.

The set of keys p which as will be hereinafter described control the primary location of the selector means, and the corresponding bell-crank levers 112, will be referred to as the "primary" keys and bell-crank levers; the set of keys s which as will be hereinafter described control the secondary location of the selector means, and the corresponding bell-crank levers 114, will be referred to as the "secondary" keys and bell-crank levers; while the set of keys t which as will be hereinafter described control the tertiary location of the selector means, and the corresponding bell-crank levers 115 will be referred to as the "tertiary" keys and bell-crank levers. Accordingly, when a primary key p is depressed it will oscillate the corresponding bell-crank lever 112; when a secondary key s is depressed, it will oscillate the corresponding bell-crank lever 114; while when a tertiary key t is depressed, it will oscillate the corresponding bell-crank lever 115.

There are, therefore, provided three sets of keys and it will hereafter appear that the primary set of keys (in this particular embodiment, employing the decimal system) adjust the selector means for location of the hundreds groups or divisions; the set of secondary keys adjust the selector means in order to locate the tens subdivision; while the tertiary keys adjust the selector means to locate the unit or digit.

Primary selector location.

Referring to Figures 4, 6 and 11, each of the ten effectual bars C is provided with a lug 139 engaged by a latch 140 on a shaft 141. Each latch 140 is connected by a link 142 with an arm 143 of the primary bell-crank lever 112 (moved by a spring 144) connected to a cross-bar 145. The springs 144 operate to maintain the latches 140 in latching engagement with their respective bars, to retain these bars set against the tension of their springs 87.

Upon depression of any primary p key, the mechanism as heretofore described, will operate to swing the bell-crank lever 112 corresponding to the depressed key, and this will move the toe of the latch 140 down, Figure 6, releasing its bar C, which will now be actuated by its spring 87, to engage the cam thereon with the cross-bar 74, and move this cross-bar and swing the bell-crank lever 77—79 on its pivot, clockwise, Figure 8, thereby moving the pin 80 in the path of the lug on the actuator bar 81. This will render a pair of selectors and the corresponding pilots opposite the positioned cross-bar, effective for actuation vertically, when the actuator bar 81 is thereafter released, while all of the other selectors and pilots are left undisturbed.

Secondary selector location.

Figure 7:
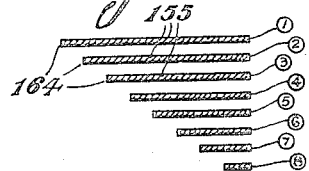
Figure 7 is a detail section on the line 7, Figure 6.

Referring to Figures 6, 7 and 10, the cross-bar 61, connecting the side bars 56, is engaged by a pair of latches 150, loose on the shaft 151, connected by a cross-bar 152, and held in engagement by springs 153. Pivoted in properly spaced relation on the shaft 151, are a series of nine stop arms 154, having each slidably mounted thereon, a stop 155 adapted to engage cross bar 61, which is held in retracted position by a spring 156 (Figure 6). Each arm has an extension 157, adapted to engage the cross-bar 152 and latched by an arm 158, on the secondary bell-crank lever 114, against the tension of a spring 159 connecting an extension 160 on an arm 154 with a cross-bar 161. The spring 159 is stronger than the springs 153, while the springs 67 are stronger than a spring 156. The cross-bar 61, where engaged by latches 150 and stops 155 is faced with a hardened plate to reduce wear.

The stops 155 (Figure 7) have stop shoulders 164, arranged for stopping the selector carriers 56 at variable distances along their supporting carriage 40, to position the selectors at variable distances longitudinally of the machine, and locate them in alignment with the proper row of plungers corresponding to the selected subdivision of cards and the pilot therefor.

When a selected secondary *s* key is depressed, thereby actuating a selected bell-crank lever 114, the latch 158 will be moved to the left, Figure 6, releasing the stop arm 154 and causing its spring 159 to move it down. During this movement of the stop arm 154, its extension 157 will engage the cross-piece 152 and move the latches 150 down, releasing the cross-bar 61 and the connected selector carriers, and positioning the stop shoulder 164 on the depressed stop 155 in the path of the cross-bar 61. The springs 67 will now move the carrier to the right, engaging the cross-bar with the stop shoulder, which now moves with the cross bar (overcoming the spring 156) until the stop and the carriers are positively arrested. This will place the carriers, together with all the selectors connected therewith, so as to position that pair of selectors which have been rendered effective for actuation, as heretofore described, in proper cooperative relation with respect to the selected set of plungers 29 and heads 34 of a selected subdivision or group of cards and its pilot.

There are only eight stop arms 154, for when the "0" key is depressed, the selectors need not move forwardly, because they are normally in cooperative relation with the "0" subdivision of cards and its pilot. Accordingly, the selector carriers need not be released at this time, and "0" arm 154 is, therefore, omitted Figure 10.

Since the travel of the selector carriers upon depression of the "9" key is a maximum, the "9" stop arm can also be omitted, but a ninth member 157 and arm 160 are provided to trip the latches 150. To arrest the selector carriers upon depression of the "9" key, a stop 165 (Figure 6) connects a pair of arms 166 on a rock-shaft 167, which is held yieldingly in the position shown in Figure 6, by a spring 170, as hereinafter described. The yielding stop 165 is arrested by a fixed stop 168 extending forwardly between the arms 166 (Figures 6 and 10), and fixed to a cross-bar 169 mounted on the side plates 12. Upon depression of the "9" key, the release of the cross-bar 61 will cause it to engage the yielding stop 165, and the springs 67 will move the selector carriers and the cross-bar further until the yielding stop is arrested by the fixed stop 168, whereupon the selector carriers and the selectors mounted thereon will be arrested with the selectors in proper cooperative relation with respect to the cards and pilot in the "9" subdivision. The function of the yielding construction of the stops will be more fully described hereinafter.

Upon depression of any other secondary key except a "0" or "9" key, the operation is as follows, (Figure 6). The proper stop arm 154 will be released and will move down so as to place the stop shoulder 164 on the slide or stop 155 in the path of the cross-bar 161 and with the end of the slide 155 adjacent the yielding stop 165. Upon release of the cross bar, it will press against the shoulder 164, the spring 156 yielding so that the slide will press against the yielding stop 165 carrying this stop with it, until arrested by the fixed stop 168. The operation is otherwise as takes place upon the depression of the "9" key.

*Tertiary selector location.*

Referring to Figures 3, 8, 9, 11 and 12 and 14, the cross-head 53 (Figures 3 and 11) has an extension 175 extending forwardly and supported in guides 173, and by guide-pins 177 (Figure 8) engaging guideways 178 in the brackets 176. A plate 179 on the extension has a shoulder 174 (Figure 11) provided with lugs 180, engaged by the latches 181, pivoted on a shaft 182, and connected by a cross-piece 183, so as to move in unison. Springs 184 engaging latch arms 185, maintain the latches 181 normally in engagement with the lugs 180. These latches retain the cross-head 53 (Figure 3) in retracted position against the tension of the spring 55, with the side bars of the carriage at the outside limit of their movements, and with the card selectors in position to normally cooperate with the "0" card plungers 29 (Figure 13).

Loosely mounted on the shaft 182 are a series of nine arms, 186 (Figures 8 and 9), eight of which are provided with stop shoulders 187, corresponding to "1" to "9" positions, except that the shoulder on the "5" arm is omitted. Arm extensions 188 on the arms 186 pass underneath the cross-bar 183 and have attached springs 189 (each stronger than spring 184) anchored on a cross-bar 190. Each extension has a lug 191 engaged by an arm 192 on the tertiary bell-crank lever 115, and the latter is maintained in engagement by one of the springs 193. The plate 179 has sliding thereon, (Figures 8 and 11) a plate 195, which is yieldingly retained in its right hand position by a spring 172 connecting the plates, and which has a shoulder 196 adapted to be arrested by one of the stop shoulders 187.

Upon operation of a selected tertiary key, the lever 115 is moved clockwise, Figure 8, releasing the corresponding stop arm 186 and moving the stop 187 thereon, in the path of the shoulder 196. The extension 188 will engage the cross-bar 183 and move the latches 181 down, releasing the extension 175, which will now, under the action of its spring 55 (Figure 3) move the cross-head 53, and the connected extension 175 to the right, Figures 8 and 11 carrying the shoulders 174 and 196 with it, until the shoulder 196 is arrested by the stop 187. The plate 195 stops while the plate 179 continues its movement until the shoulder 174 abuts against and is arrested by the shoulder 196.

As heretofore described, the spring 55 (Figure 3) will, upon release of the crosshead 53, move the side bars 40 of the selector carriage inwardly until the crosshead 53 is arrested, and the side bars 40 and the card selectors connected therewith will, therefore, move inwardly to positions corresponding to the depressed key. In Figure 14 (dotted lines) the card selectors have been moved inwardly to align with the plungers "2" corresponding with the depressions of key number "2", to locate a card in the subdivision of cards.

The "0" stop arm, together with the "0" arm 192, are omitted, because the card selectors are normally in a position opposite the "0" plungers (Figures 14 and 12). Consequently, the depression of the "0" key need have no effect in adjusting the selectors.

The stop shoulder 187, and even a stop arm 186 for the "5" key, can be omitted, because the "5" plungers, are at the innermost positions (Figure 14), so that the "5" selectors should be given maximum movement. Accordingly, a bridge 197 (Figures 8 and 11), embracing and connected to the brackets 176, forms a fixed stop for the shoulder 196.

*The selector actuating mechanism.*

Referring to figures 2, 6, and 8, the actuator bar 81 has a lug 200, engaged by a pair of latches 201 and 202, pivoted on a stud 203 on the right side plate 12. A spring 204 anchored to a pin 205 on the plate holds the latch 201 in engagement. A link 206 connected with the latch has a lost motion connection with an arm 207 fixed to the rockshaft 167, whereby release of the cross-bar 61, as heretofore described, and movement of the yielding stop 165 to the right, Figure 6, (at the time that the second key is depressed to position the selectors to locate a subdivision of the selected group of cards) will rock the shaft 167 and raise the latch 201 (Figure 8) to release it from lug 200. It will be understood that the springs 67 are strong enough to overcome springs 170 and 204.

As heretofore described, the depression of a secondary "0" key, does not release the cross-bar 61, and the yielding stop 165 will not be actuated at this time. Auxiliary mechanism must, therefore, be provided. Accordingly, (Figures 8 and 10) the "0" arm 114 has an extension 208, connected with a link 209 having a lost motion connection with an arm 210 fixed to the rock shaft 167. Actuation of the "0" key to position the selectors in order to locate the subdivision of cards, will rock the shaft 167, counter-clockwise, raising the arm 207 and the latch 201 to release it from the lug 200.

The actuation of the latch 201 still leaves the latch 202 in engagement and the actuator bar, therefore, remains locked. This latch 202 is, therefore, tripped after and upon depression of the tertiary key, and after the selectors have been finally positioned to locate the selected card. Accordingly, (Figures 8, 10, 11, and 12), the latch 202 has a pin 211 engaging a slotted link 212, connected to a lever 213 (Figures 11 and 12), pivoted on the base, 11, and connected to one arm 214 of a bell-crank lever, pivoted at 2150 on a bracket 176, and having an arm 215 connected by a cross-bar 216, with an arm 217 also pivoted on the bracket. The latch 202 is held in operative engagement by a spring 218 (Figure 8).

As shown in Figures 8, 11 and 12, the plate 179 has pivoted thereon a bell-crank lever, having an arm 219 connected by a link 220 with the yielding plate 195 and an arm 221 in the path of the bar 216. Upon movement of the selectors transversely to locate a card (at which time the plate 179 is carried forward by the spring 55) the bell-crank lever 219—221 will move with plates 179—195, until the plate 195 is arrested by the stops 187 or 197. Thereafter, the plate 179 will continue, carrying the bell-crank lever with it, thereby swinging it and causing its arm 221 to move outwardly, Figure 11, to engage and move along the crosspiece 216, and swinging the arms 215 and 217 on their pivots, which will, through the connections of the arm 214, lever 213, and link 212, raise the second latch 202 completely releasing the actuator bar 81.

As heretofore described, the depression of the tertiary "0" key will have no effect upon shifting of the selectors laterally of the machine. The arm 115, therefore, has an extension 222 connected with a link 223 having a lost motion connection with an arm 224 on the latch 202 (Figures 8 and 10). The depression of the tertiary "0" key will, therefore, raise the latch 202, and release the actuator bar 81.

*Operation.*

As heretofore described, the depression of the primary key will render a pair of card selectors, and a pair of corresponding pilot selectors, operative for actuation by positioning the pin 80 on a bell-crank lever in proper cooperative relation with a proper shoulder on the actuator bar 81, and to position the proper cross-bar 74 in cooperative relation with the head 73 on the proper selector 61. If, for instance, the primary key depressed is a "1" key, the parts will be in proper cooperative relation to actuate the card and pilot selectors in the one hundred group. Pressing, say, the secondary and tertiary "2" keys, will release the actuator bar. Upon release and movement of the actuator bar, the "1" actuating lug engages the pin 80 on the bell-crank lever 77—79, swinging it and raising the links 76 and the cross-bar 74 connected therewith, thereby raising the card and pilot selectors, and raising card "122", and the corresponding pilot. The lost motion between the card selectors 68 and the plungers 29, is greater than the lost motion between the pilot selectors 93 and the plunger heads 34 (Figures 12 and 14). Accordingly, the pilot is raised a greater distance than the card, with the result that the pilot will project some distance above the raised card.

The mechanism, therefore, operates by a series of eliminations to locate the selectors: First with respect to a group of elements, then with respect to a subdivision of that group, then with respect to an element in that subdivision, and thereafter these selectors are actuated to isolate the located card and pilot. The primary location is one of rendering a pair of selectors operative, and the secondary, tertiary locations are obtained by the positioning of a pair of selectors, first by a movement jointly along the assembled cards, and second, by a movement relatively along a card. The pilot of the group or subdivision containing the card is located at the same time and by the same operations, and the selectors are actuated to isolate the pilot at the same time that the selectors are actuated to isolate the card.

*The mechanism for clearing the machine.*

Referring to Figures 1, 2, 5, 6, 8, 10, 11 and 12, a stub shaft 230 in the plate 12 (Figure 8) has a crank arm and operating handle 231 Figure 2 and a crank 232. This crank carries a link 233, having a lost motion connection with an arm 234 fixed to a rock-shaft 182, and having a toothed segment 236 meshing with a segment 237 on a rock-shaft 238. The crank 232 has also a link connection 239 with a cam 240 on a stub shaft 241.

Fixed to the rock-shaft 238 are pairs of spaced arms 242 (Figures 5, and 6) each of which carries a set of five links 243, connected with the effectual bars C, by a pin 244 in each bar C, engaging a slot 245 in each link (Figure 6), so that when a bar C is released it can travel to the right, Figure 6, without disturbing the other bars. Forward movement of crank arm 231, therefore, moves all of the links 243 forwardly, returning released bar C into locking engagement with its latch 140 (Figure 6). The crank arm 231 can now be again returned to normal position (Figure 2) and to stop the parts in normal position, the rock-shaft 182 is provided with a lug 246 engaging a stop 247 on the left side plate, Figure 6.

The rock-shaft 238 has fixed thereto a pair of arms 248 connected by links 249 with the arms 65, operating the selector carriers 56. A pin 250 on each arm 65 engages a slot 251 in each link 249 (Figures 8 and 11) to provide lost motion. Each arm 65 is connected (Figures 2, 6 and 10) by a link 252 with a projecting lug 253 on a pilot carrier 90. The rock-shaft 182 also carries an arm 254 connected by a link 255, with an arm 256 on the rock-shaft 151 (Figures 6 and 10). This rock-shaft carries a pair of arms 257 connected by a cross-bar 258, arranged in back of the extension 160 on the stop arm 154, and having lost motion with respect thereto. When the crank arm 231 is moved forwardly, it will move the card and pilot selector carriers 56 and 90 forwardly until the cross-bar 61 engages the latches 150, latching these carriers in their normal position (Figure 6). Concurrently the connections with the cross-bar 258 will swing the released stop arm 154 (by engagement with extension 160) on its pivot until the extension 157 snaps under the latch 158, latching the stop arm in normal position against the tension of its actuating spring 159.

Figure 3:
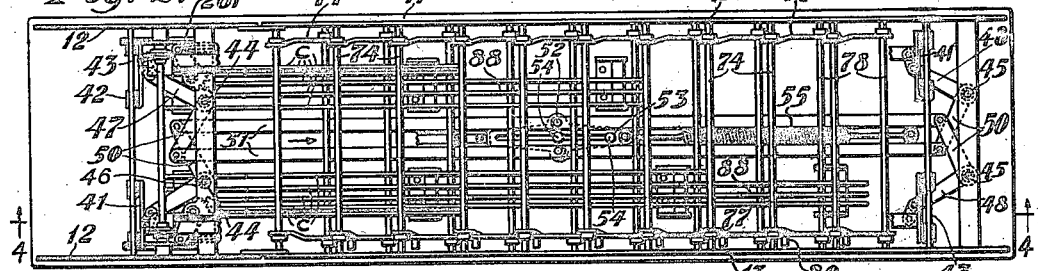
Figure 3 is a section on the line 3—3, Figure 2.

The arms 248 (Figures 8, 11, and 12) have connected links 260 which have lost motion connections 262, 263, with arms 261 (Figure 3). These arms 261 rock on pivots on the cross-bar 46, and have segments Figure 3 meshing with toothed segments on the arms 47 Figure 3. Fixed to the rock-shaft 182 is a pair of arms 266 connected by a cross-bar 267 (Figure 8) engaging extensions 268, one on each stop arm 186. When the crank arm 231 is moved forwardly, it will move side bars 40 of the selector carriage outwardly against the tension of the spring 55, (Figure 3) until the lugs 180 engage the latches 181. Concurrently, cross-bar 267 engages the extension 268 on the released stop arm 186, to swing it to normal position, Figure 8, raising this arm, and moving the extension 188 under extension 192 on the lever 115, thereby latching the released stop arm in normal raised position. This will return the selectors to and latch them in "0" position, (Figure 8).

Referring to Figure 8, the cam 240 has a cam face 269 engaging a cam roll 270 on one arm 271 of a bell-crank lever, pivoted on the shaft 66. The other arm 273 is connected to a link 274, having a lost motion connection 275—276 with the actuator bar 81. When the crank arm 231 is moved forwardly, the movement of the cam 240 (Figure 8) will move the actuator bar 81 forwardly against the tension of its spring 84. The latches 201 and 202 which have by this time returned to normal positions, will now hook over the lug 200, and latch the actuator bar in normal position against the tension of its actuating spring 84.

Prior to the movements of the selectors transversely and longitudinally of the machine, it is necessary that these selectors shall have been dropped back to normal positions (Figures 6, 8 and 14). Accordingly, the clearing connections must be such that the actuator bar 81 is returned before any of the other mechanisms operate to any appreciable extent, and before the lost motion to these parts is taken up. The cam face 269 of the cam 240 has a very sharp rise followed by a circular portion (Figure 8), and the arm 271 is short, while the arm 273 is long. Accordingly, movement of the cam 240, through a very small angle, will not only take up any remaining lost motion in the connection to the bar 81, but will also return this bar to normal position. The connections are such that this bar 81 will be moved back to normal position to permit the selectors to drop to clear the actuated plungers before the connections for shifting the selector carriers longitudinally and transversely of the machine become effective, after which the roll 270 will ride idly on the circular portion of the cam 240.

All of the parts are, therefore, returned to normal positions and latched against the tension of their actuating springs, thereby permitting the machine again to be set to successively position the selectors to final locating position. The lost motion connections are provided to permit the release of any element to take place without affecting the other elements.

*Summary of operation.*

Assuming all the parts in their normal positions, and that the auditor desires to select a certain card bearing a certain number, for instance card number "122", the operations will be as follows:

The auditor will successively depress primary, secondary and tertiary keys numbers "1", "2" and "2". This will operate the mechanisms to locate and isolate card number "122", together with the pilot in the compartment or subdivision of ten cards containing the selected card. The selected card being raised above the remaining cards (Figures 2 and 14), and its corresponding pilot being also raised, the position of this isolated card is readily observed. The isolated card number "122" can now be withdrawn for inspection or other purposes, and can then be returned to its proper subdivision or compartment.

The parts remain in position with both the card and pilot selectors raised, until the machine is cleared by pulling the crank arm 231 forwardly. Accordingly, after the selected and isolated card has been withdrawn, the corresponding pilot will remain in raised position to indicate the subdivision or compartment from which the card has been withdrawn. Therefore, when the auditor desires to return the card, he does not have to search to find the proper compartment, as its position is indicated. By providing, therefore, mechanism for setting the selecting means by the depression of the keys corresponding to the number of the desired card, and by returning the selecting means upon movement of a manually operated element, such as the handle or crank arm, the return of a card to its proper compartment is facilitated, for the reason that the pilot remains in raised position to isolate the subdivision or compartment from which the card has been withdrawn, until the handle is operated to clear the machine. If this handle were so connected as to isolate the card and its pilot, and would upon its return movement clear the machine, then the selectors would again have to be set when it would be desired to return the card to its proper subdivision or compartment.

If a card has been withdrawn and kept out for any length of time, or if a series of cards are successively withdrawn, thereby necessitating that the machine be cleared, the cards can be returned to their respective positions by successively setting the mechanism upon depression of the keys corresponding to the numbers of the cards, and such depression will successively raise the pilots to isolate the subdivisions or compartments from which the cards have been withdrawn, so that these cards may readily be replaced in their respective compartments. Each card (Figures 14 and 15) has a pair of selector engaging lugs corresponding in position along the cards to the positions of the plungers along the compartment in which a set of cards are located. The width of each plunger (Figures 6 and 13) is equal to the width of the compartment, and therefore, equal to the combined thickness of a set of subdivision of ten cards. Accordingly, the cards of a set need not necessarily be placed in their numerical order in their compartment, because no matter where, for instance, card number "122" is placed in its compartment, its lugs will always be in a position to be engaged by their cooperating plungers. Accordingly, a withdrawn card can be placed in any position in its compartment, and upon depression of the keys corresponding to the number of the card, this card will always be elevated to isolate it from the remaining cards of the set in that compartment. Consequently, the auditor need not search even through the cards in any compartment, whether a given card is to be withdrawn or replaced. Consequently, the only card which is handled or fingered is the card which is to be withdrawn or replaced.

The actuator bar 81 is retained by two latches 210 and 202, as heretofore described, and these latches are raised by different trains of mechanism, one operated upon depression of the secondary key when the selectors are shifted to locate a subdivision, while the latch 202 is operated after depression of the tertiary key, and when the selectors are positioned to locate the desired card. Neither of these latches is raised until the corresponding shifting movement of the selectors has been completed. Accordingly, the actuator bar is not released to raise the selectors until both adjustments of the selectors have been finally completed. This is an important feature, for the reason that the selectors have variable movements in both directions, and that there is a time element involved in each of these movements. If, therefore, the first latch 201 were omitted, and for instance the keys be rapidly depressed in the order 1—9—1, the lateral movement of the selectors would be completed before the longitudinal movement would be completed, and accordingly the actuator bar would be released before the selectors would be in final adjusted position along the assembled cards. By, however, providing two latches controlled and actuated only upon release of the setting mechanisms connected therewith, it is insured that the selectors will reach their final adjusted positions transversely as well as longitudinally of the machine before these selectors are actuated.

It is obvious that various changes may be made in the details of construction without departing from the spirit of this invention; it is, therefore, to be understood that this invention is not to be limited to the specific construction shown and described.

Having thus described the invention, what is claimed is:

1. In an apparatus of the class described, the combination with selector means, of mechanism adapted to successively locate said selector means in accordance with the successive orders of a given system, selective manipulative elements, corresponding respectively to the orders, adapted to control said mechanism, and a frame having bearings for supporting said means, mechanism and elements for cooperative relation.

2. In an apparatus of the class described, the combination with selector means, of mechanism adapted to successively locate said selector means in accordance with the successive orders of a given system, keys arranged in sets in accordance with the orders of the system, adapted to control said mechanism, and a frame having bearings for supporting said means, mechanism and keys for cooperative relation.

3. In an apparatus of the class described, the combination with selector means, of mechanism adapted to successively locate said selector means in accordance with the successive orders of a given system, keys arranged in sets in accordance with the orders of the system and with the keys of a set corresponding to the digits of its order, adapted to control said mechanism, and a frame having bearings for supporting said means, mechanism and keys for cooperative relation.

4. In an apparatus of the class described, the combination with selector means, of mechanism adapted to diminishingly locate said selector means in accordance with the successive divisions of a given system, selective manipulative elements corresponding respectively to the divisions of the system, adapted to control said mechanism, and a frame having bearings for supporting said means, mechanism and elements for cooperative relation.

5. In an apparatus of the class described, the combination with selector means, of mechanism adapted to diminishingly locate said selector means in accordance with the hundreds and tens of the decimal system, decimal selective manipulative elements corresponding to the hundreds and tens respectively, adapted to control said mechanism, and a frame having bearings for supporting said means, mechanism and elements for cooperative relation.

6. In an apparatus of the class described, the combination with selector means, of mechanism adapted to diminishingly locate said selector means in accordance with the hundreds, tens and units of the decimal system, sets of decimal keys corresponding to the hundreds, tens and units respectively, adapted to control said mechanism, and a frame having bearings for supporting said means, mechanism and keys for cooperative relation.

7. In an apparatus of the class described, the combination with a selector adapted for location in accordance with a given system, of means for locating said selector in accordance with one order, means for locating said selector in accordance with another order, selective manipulative elements corresponding respectively to the orders and adapted to control said locating means, and a frame having bearings for supporting said selector, said means and said elements for cooperative relation.

8. In an apparatus of the class described, the combination with a selector adapted for location in accordance with a given system, of means for locating said selector in accordance with one order, means for locating said selector in accordance with another order, sets of keys corresponding respectively to the orders and adapted to control said locating means, and a frame having bearings for supporting said selector, said means and said keys for cooperative relation.

9. In an apparatus of the class described, the combination with a selector adapted for location in accordance with a given system, of means for locating said selector in accordance with a unit of that system, means for locating said selector in accordance with a digit of that unit, sets of keys corresponding respectively to the units and digits and adapted to control said locating means, and a frame having bearings for supporting said selector, said means and said keys for cooperative relation.

10. In an apparatus of the class described, the combination with selector means, of means for adjusting said selector means in order to effect a series of primary locations, means for adjusting said selector means to a series of secondary locations, primary and secondary selective manipulative elements adapted to control said respective adjusting means, and a frame having bearings for supporting said means and said elements for cooperative relation.

11. In an apparatus of the class described, the combination with selector means, of means for adjusting said selector means in order to effect a series of primary locations, means for adjusting said selector means to a series of secondary locations means for adjusting said selector means to a series of tertiary locations, primary secondary and tertiary selective manipulative elements adapted to control said respective adjusting means, and a frame having bearings for supporting said means and said elements for cooperative relation.

12. In an apparatus of the class described, the combination with selector means, of means for adjusting said selector means in order to effect a series of primary locations, means for adjusting said selector means to a series of secondary locations, primary and secondary sets of keys adapted to control said respective adjusting means, and a frame having bearings for supporting said means and said keys for cooperative relation.

13. In an apparatus of the class described, the combination with selector means, of means for adjusting said selector means in order to effect a series of primary locations, means for adjusting said selector means to a series of secondary locations means for adjusting said selector means to a series of tertiary locations, primary secondary and tertiary sets of keys adapted to control said respective adjusting means, and a frame having bearings for supporting said means and said keys for cooperative relation.

14. In an apparatus of the class described, the combination with a selector, of primary and secondary selective manipulative means adapted to adjust said selector to corresponding primary and secondary locations, and a frame having bearings for supporting said selector and said means for cooperative relation.

In testimony whereof we affix our signatures this 20th day of August 1919.

LUTHER A. WATTERS.
SAMUEL F. LLOYD.